(12) United States Patent
Giaume et al.

(10) Patent No.: US 6,330,580 B1
(45) Date of Patent: Dec. 11, 2001

(54) PIPELINED FAST FOURIER TRANSFORM PROCESSOR

(75) Inventors: Olivier Ludovic Giaume, Cannes, La Bocca (FR); Peter Paul Frans Reusens, Laarne; Daniel Veithen, Grimbergen, both of (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/266,907

(22) Filed: Mar. 12, 1999

(30) Foreign Application Priority Data

Mar. 13, 1998 (EP) .................................................. 98400603

(51) Int. Cl.[7] .................................................. G06F 17/14
(52) U.S. Cl. .......................................... 708/406; 708/408
(58) Field of Search .................................. 708/403, 404, 708/406, 408, 409

(56) References Cited

U.S. PATENT DOCUMENTS

| | | |
|---|---|---|
| 4,393,457 * | 7/1983 | New ...................................... 708/404 |
| 4,689,762 | 8/1987 | Thibodeau, Jr. . |
| 5,293,330 | 3/1994 | Sayegh . |
| 5,303,172 * | 4/1994 | Magar et al. .......................... 708/406 |
| 5,633,817 | 5/1997 | Verhenne et al. . |
| 6,115,728 * | 9/2000 | Nakai et al. .......................... 708/404 |
| 6,230,176 * | 5/2001 | Mizutani .............................. 708/404 |

FOREIGN PATENT DOCUMENTS 0 329 023 A2   8/1989   (EP) .
0 478 128 A2   4/1992   (EP) .

* cited by examiner

*Primary Examiner*—Tan V. Mai
(74) *Attorney, Agent, or Firm*—Sughrue Mion, PLLC

(57) ABSTRACT

A pipelined Fast Fourier Transform Processor includes, besides a memory arrangement, a cascade of a first arithmetic unit, a scratch memory and a second arithmetic unit. One of both arithmetic units can only perform at least one type of butterfly Fast Fourier Transform arithmetic calculations, whereas the other one can perform, besides this at least one type of butterfly Fast Fourier Transform arithmetic calculations, at least one second type of butterfly Fast Fourier Transform arithmetic calculations. This architecture optimises both timing as well as circuit restrictions.

11 Claims, 2 Drawing Sheets

FFTP

PIPELINED FAST FOURIER TRANSFORM PROCESSOR

BACKGROUND OF THE INVENTION

The present invention relates to a pipelined Fast Fourier Transform processor as is described in the non-characteristic part of claim 1.

Such a pipelined Fast Fourier Transform processor is already known in the art, e.g. from the published European Patent Application "Pipelined Fast Fourier Transform processor", publication number 0478128A2. Therein, a pipelined Fast Fourier Transform processor is described, including a cascade of four Butterfly Arithmetic Units, abbreviated with BAU in the prior art document. Each of these units processes data received at its input ports and generates a pair of output signals, which are consecutively applied to the input ports of the next stage, or in case of the final fourth stage, to memory locations via a multiplexer. Within each unit, the output signals, before being delivered to the next unit, are temporarily stored in four registers. Two of the cascaded units of the prior art document can thus be considered as corresponding to the first and second arithmetic unit of the present invention, whereas the four registers included in the first stage of the prior art, can be considered as corresponding to the scratch memory of the pipelined Fast Fourier Transform processor of the invention. The multiplexer together with the memory locations of the prior art thereby constitute the memory arrangement included within the Fast Fourier Transform processor of the invention.

The units of the prior art processor all include the same building blocks for performing a radix-two-operation Fast Fourier Transform, hereafter abbreviated by FFT, operation on their respective input data, as is explained in the prior art document.

For some applications, such as for instance in Very High Speed Digital Subscriber Line transmission and receiving modules, a 512 point real FFT, is to be performed in less than 1024 clock cycles, whereby during each cycle one data point is read from the memory arrangement into the first arithmetic unit. As is well known by a person skilled in the art, performing a 512 point real FFT in fact corresponds to performing a 256 point complex FFT, taken into account some changes such as these explained for instance in the US Patent nr. 5,633,817 "Fast Fourier Transform Dedicated Processor". However, when performing a 256 point complex FFT using the architecture of the prior art processor, too much multipliers are needed for obtaining the target timing restrictions. Indeed, for performing a 256 point complex FFT, 8 of the prior art radix-2 type BAU's have to be passed. Using only two of these BAU's or stages in cascade, while passing 4 times through the pipeline, already consumes more than 4×256 clock cycles for reading input data from the memory arrangement to the first BAU, definitely already exceeding the target timing restrictions. Therefore, for complying with the timing restrictions, minimum three of these BAU's are required to be put in the cascade. Since each prior art BAU includes 4 multipliers, as is clear from FIG. 2 of the prior art document, in total thus 12 multipliers have to be included in the processor. Taken however into account the state of the art of the integrated circuit technology at the time of the invention, a total of 12 multipliers would result in a too large integrated circuit area.

Summary of the Invention

An object of the present invention is to provide a Fast Fourier Transform processor of the above known type but which succeeds in compromising both restrictive timing as well as integrated circuit area requirements.

According to the invention, this object is achieved due to the fact that said Fast Fourier Processor is further adapted as is described in the characteristic part of claim 1.

In this way, two dedicated arithmetic units are provided, a smaller one, only adapted for performing at least one type of butterfly FFT calculations, and a larger one, adapted for performing, besides the aforementioned type, at least one second type of butterfly FFT arithmetic calculations. In stead of thus using three stages in series, now only two of them are needed, a small and a large one. This solution definitely requires less chip area with respect to the prior art solution. With respect to the timing, for performing a 512 point real FFT, this solution only requires 3 passes through the cascade or pipeline, as will be explained more into detail in a further paragraph. The timing is thus within the timing specification.

The above mentioned object is also achieved as described in the characteristic part of claim 2 which is a straightforward alternative of claim 1 and wherein the first arithmetic unit in which the input data are first treated, may as well be the smaller one, whereby the second arithmetic unit which is to be passed in the pipelined structure, is the larger one.

Yet a further characteristic feature of the present invention is described in claims 3 and 4.

For some applications, it may be desirable to first bypass the first arithmetic unit, after which the second arithmetic unit in the pipeline will execute the first FFT related operation. For these applications a simpler control of the memory arrangement is obtained, especially when the number of butterfly FFT operations to be performed by the arithmetic units is non-even, as will be explained more into detail in the descriptive part of this document.

Still a further characteristic feature of the present invention is described in claim 5.

If, after the first pass through the pipeline, the final FFT result is not yet obtained, a second pass will be necessary. This claim indicates that the pipeline is always to be followed in the same direction, from the first arithmetic unit to the second, after which the memory arrangement is adapted to deliver the intermediate FFT results back to the first arithmetic unit and so on. This is the direction which was also followed in the prior art FFT processor.

Another characteristic feature of the present invention is described in claims 6 and 7.

This means that the direction of processing within the pipeline can be reversed after each pass through the pipeline. The reversal of the direction after each pass results in a simpler memory arrangement. Indeed, since the memory arrangement includes some dedicated locations for storing input data, to be delivered to the first arithmetic unit, and dedicated locations for storing intermediate results delivered by the second arithmetic unit, re-use of the connection between the second arithmetic unit and the memory arrangement through re-use of these intermediate FFT results by this second arithmetic unit, definitely results in a simpler arrangement compared to the case where additional connections need to be established between the locations for storing these intermediate results and the first arithmetic unit.

Further characteristic features of the present invention are mentioned in the appended claims 8 to 11.

The basic computational steps executable by both arithmetic units thereby consist of a radix-4 type Fast Fourier Transform step, whereas the extra alternative steps, executable by the largest of both arithmetic units consist of a radix-2 type Fast Fourier Transform step, a radix-2 type Fast Fourier Transform step followed by an add/subtract step, and a radix-4 type Fast Fourier Transform step preceded by an add/subtract step. All real and complex Fast Fourier Transform as well as all real and complex inverse Fast Fourier Transforms on an amount of points equal to a power of 2, can thereby be realised using a combinations of these mentioned steps, as is well known from e.g. specialised literature in the field. From the same literature it is also known that radix-2 type as well as radix-4 type arithmetic units both can be realised with merely 4 multipliers. Within the most complex arithmetic unit these four multipliers may be shared since only one of the 4 mentioned sets of butterfly Fast Fourier Transform arithmetic calculations is to be performed at a time. Therefore the total amount of multipliers needed within the subject pipelined Fast Fourier Transform Processor is 8, being definitely lower than the prior art solution.

BRIEF DESCRIPTION OF THE DRAWING

The above and other objects and features of the invention will become more apparent and the invention itself will be best understood by referring to the following description of two embodiments taken in conjunction with the accompanying drawings wherein.

DETAILED DESCRIPTION OF THE INVENTION

Figure 1:
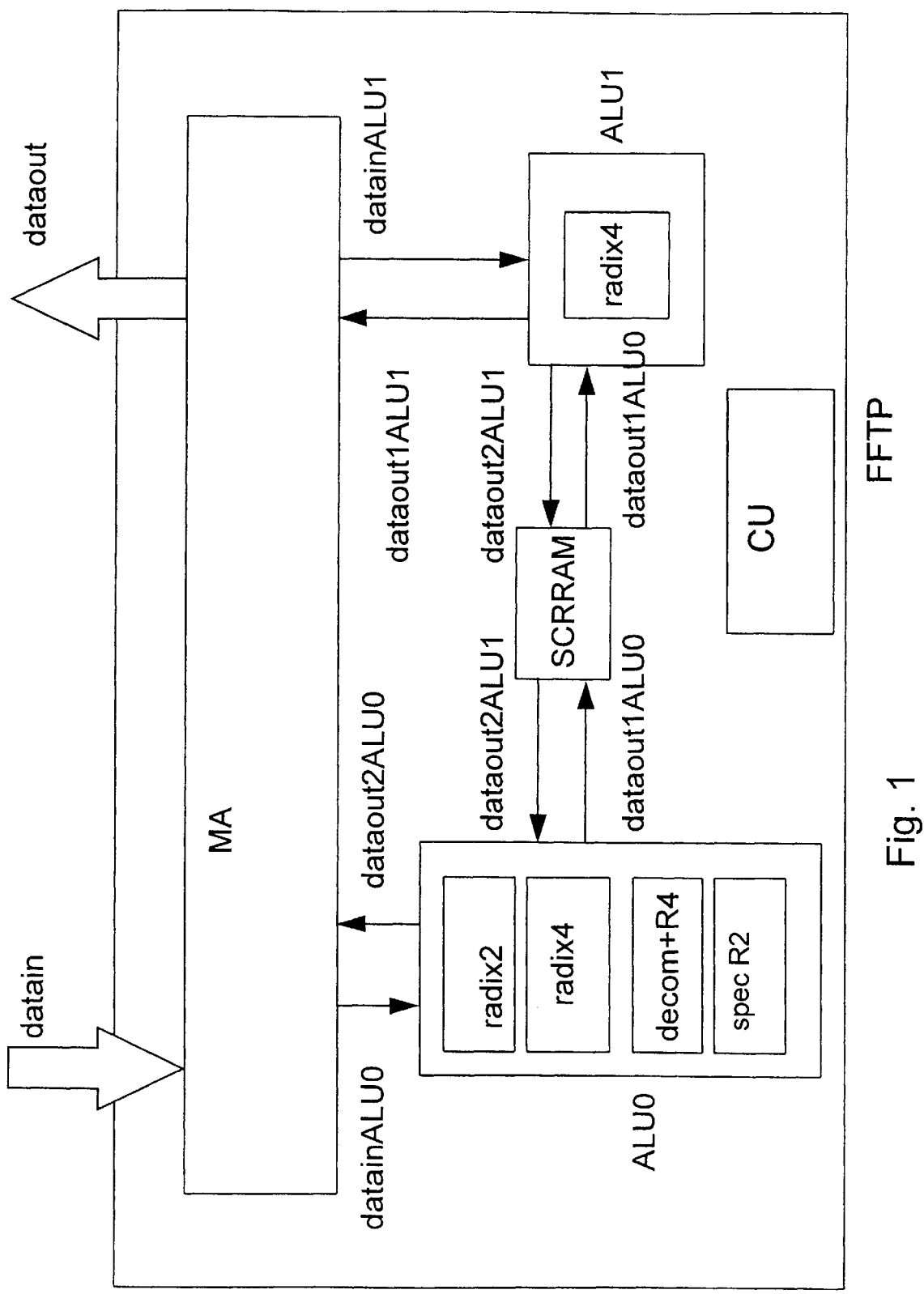
FIG. 1 represents a schematic of the pipelined Fast Fourier Transform Processor FFTP according to the invention.

A Fast Fourier Transform Processor FFTP according to the present invention is schematically depicted in the FIG. 1. This processor includes a memory arrangement MA, adapted to receive successive samples of input data, denoted datain, from an input terminal (not shown in FIG. 1), to temporarily store these successive samples of input data, before delivering them to a first arithmetic unit ALU0, to temporarily store intermediate or final Fast Fourier Transform results, received from either this first arithmetic unit ALU0, or from a second arithmetic unit ALU1, and to deliver the final Fast Fourier Transform results as successive output data, denoted dataout, to an output terminal (not shown in FIG. 1).

This memory arrangement MA therefore not only includes the memory locations as such, but also read/write circuitry and accompanying read/write addressing encoding/decoding circuitry. Such memory arrangements are commonly known to persons skilled in the art and will therefore not be described into detail in this document.

In the Fast Fourier Transform processor depicted in FIG. 1, the first arithmetic unit ALU0 included within FFTP is bidirectionally coupled to the memory arrangement MA. However other embodiments exist wherein ALU0 is only adapted to unidirectionally receive data from MA. In the embodiment of FIG. 1, ALU0 is adapted to receive from the memory arrangement MA a first set of first arithmetic unit input data, denoted datainALU0, for performing thereon one of the following butterfly FFT arithmetic calculations: either a radix-2 type calculation, a radix-4 type calculation, a radix-4 type calculation preceded by an add/subtract step, or a radix-2 type calculation followed by an add/subtract step.

The radix-2 type calculation is performed by a block denoted radix2, the radix-4 type calculation by a block denoted radix4, the radix4 preceded by an add/subtract step by a block denoted decom+R4, and the radix-2 type followed by an add/subtract step by a block denoted specR2. It is to be remarked that all these functional blocks need 4 multipliers, which may be shared since only one function is used at a time for treating incoming data. The figure may in this respect be misleading since some circuitry, for example 4 multipliers together with some adders/subtracters, are shared by the 4 different blocks.

The result of either one of these 4 arithmetic calculations, performed on the set of first arithmetic unit input data, datainALU0, is denoted dataout1ALU0 and is delivered by the first arithmetic unit ALU0 to a scratch memory denoted SCRRAM. In some embodiments ALU0 is also adapted to merely bypass its incoming data so that dataout1ALU0 in this case corresponds to datainALU0.

The scratch memory is adapted to temporarily store these data dataout1ALU0 delivered by ALU0, for delivering them during a following time step to the second arithmetic unit ALU1 of the Fast Fourier Transform Processor FFTP. ALU1 is adapted to either bypass these incoming data to the memory arrangement MA, or to perform a radix-4 type FFT calculation on its incoming data. The result of either operation is denoted dataout1ALU1, and is delivered by ALU1 to the memory arrangement MA.

It is important to mention that the Fast Fourier Transform processor FFTP of the present invention further includes a control unit, in the figure denoted by CU, for controlling the synchronous behaviour of the diverse parts. In order not to overload the drawing, the different control signals from the control unit CU towards the different parts are however not shown. This control unit CU also controls the operation of the memory arrangement MA itself, i.e. the timing of reading data from the input terminal, writing data to the output terminal, the addresses and locations within the memory where data is to be temporarily stored, and to be retrieved from, as well as internal reallocation of data towards other memory locations within the memory itself. The control signals from the control unit towards the memory arrangement further enable the memory arrangement MA to determine whether data received from the arithmetic units ALU0 and ALU1, consist of a final set of Fast Fourier Transform results, or whether these are merely intermediate results, which need to pass through the pipeline formed by the first arithmetic unit ALU0, the scratch memory SCRRAM and the second arithmetic unit ALU1, once more. The control signals from the control unit towards both arithmetic units ALU0 and ALU1 determine which of the previously mentioned different operations are to be performed by these arithmetic units during the consecutive time steps in order to perform a Fast Fourier Transform on a predetermined number of points, known by the control unit.

The control unit CU further controls the operation of the scratch memory in a similar way as for the memory arrangement. Since the scratch memory is however much smaller, and only includes a limited number of memory locations, in one embodiment for instance 32, compared to for instance 512 locations of the memory arrangement MA, the control logic from CU towards the scratch memory is much less complicated.

For passing through this pipeline a second time, two variants are possible. In a first variant the pipeline is again followed in the same direction from ALU0 to ALU1 , meaning that data output by ALU1 to the memory arrangement MA, are delivered back by the memory arrangement to ALU0 for a second pass through the pipeline. This may be repeated, until the final FFT result is obtained. This is the classical solution, used by most pipelined prior art processors. Some embodiments of the pipelined processor of the invention such as the one depicted in FIG. 1 are however adapted to use the pipeline in the opposite direction after each first pass through it. The second arithmetic unit ALU1 is thereby adapted to receive from the memory arrangement MA, a set of second arithmetic unit input data, denoted datainALU1. In case dataout1ALU1 is an intermediate result, datainALU1 thus contains the same data as dataout1ALU1. ALU1 then performs either the same radix-4 type FFT calculations or a bypass operation on dataout1ALU1, thereby generating a second set of second arithmetic unit output data, denoted dataout2ALU1, and delivers this set towards the scratch memory SCRRAM. The latter further delivers this data, during a further timestep, towards the first arithmetic unit ALU0, which, upon receipt of dataout2ALU1 starts executing one of the already mentioned FFT-related calculations, namely a radix-2 type, a radix-4 type, an add/subtract followed by a radix-4 type, or an add/subtract followed by a radix-2 type step or a bypass operation, depending on the control signals from the control unit CU. The resulting set of data, denoted dataout2ALU0 is delivered again to the memory arrangement MA. The latter is again adapted to determine, under control of the control unit CU, whether this received set of data dataout2ALU0 are intermediate or final FFT data. In the former case, this data is again delivered either as a new set of datainALU0 towards the first arithmetic unit ALU0, or either as a new set of datainALU1 towards the second arithmetic unit ALU1. In case dataout2ALU0 are final FFT data, the memory arrangement delivers these data as the following dataout set towards the output terminal.

Remark that in fact all combinations of passing through the pipeline are possible, merely depending on the control by the control unit, although not all of them are practical. In this respect the "ping-pong" approach, of continuously alternating directions offers the most advantages concerning internal memory management of the memory arrangement. If, for instance the initial data are stored in a first part of the memory arrangement MA, then for executing a 256 point FFT, 3 passes are needed in order to get the result as will be explained in the next paragraph. If the sequence ALU0-ALU1/ALU1-ALU0/ALU0-ALU1 is chosen, the result is stored in a second part of the memory arrangement directly coupled to ALU1, while the first part of the memory arrangement, directly coupled to ALU0 is at that moment already free for receiving new incoming data. The logic for reading and writing data to and from the memory arrangement is in this case also less complex.

With this reduced set of FFT calculations, namely radix-4 type, radix-2 type, a radix-4 type preceded by an add/subtract step, and a radix-2 type followed by an add/subtract step, all real and complex FFT and inverse Fast Fourier Transform, abbreviated with IFFT, calculations on an amount of real and complex data constituting a power of 2, can be realised. Indeed, for complex FFT and IFFT operations on a number of N points, for which N constitutes a power of 4, say $4^n$, n times a radix 4-type step has to be performed for obtaining the final FFT or IFFT results on these $4^n$. For $N=2.4^m$, first a radix-2 type operation is to be performed, followed by m times a radix 4 step. The radix-4 and radix-2 types slightly differ between the FFT and the IFFT in this sense that for instance for decimation -in -time radix 4 or radix-2 steps, an addition is to be performed for the FFT, whereas a subtraction is to be performed for the IFFT For real FFT's for which N constitutes a power of 4, say $N=4^n$, n–1 times a radix-4 type is to be calculated, followed by a final "special" radix-4 type, consisting of the radix-4 type preceded by the add/subtract step. For $N=2.4^m$, first a radix-2 type operation is to be performed, followed by m-1 radix-4 type operations, followed by the "special radix-4 type" operation.

For real IFFT's for which N constitutes a power of 4 say $N=4^n$, first an initial "prescan" consisting of a radix-2 type butterfly followed by an add/subtract step is to be executed, followed by a radix-2 type butterfly, followed by n–1 time a radix-4 type. For $N=2.4^m$, first this "prescan" step is to be performed, followed by n times a radix-4 type calculation. Remark that also for this "prescan" the radix-2 to be performed, slightly differs from the "basic" radix-2 to be performed, in this sense that again additions may be replaced by subtractions.

A person skilled in the art is adapted to realise detailed embodiments of all 4 different radix-2 type and radix-4 type blocks by means of multipliers, and adders/subtracters. When sharing different basic circuits for realising these four blocks, multiplexers have to be inserted. The control of the multipliers, adders/subtracters and multiplexers included in these subblocks is again taken care of by the control unit CU.

Figure 2:
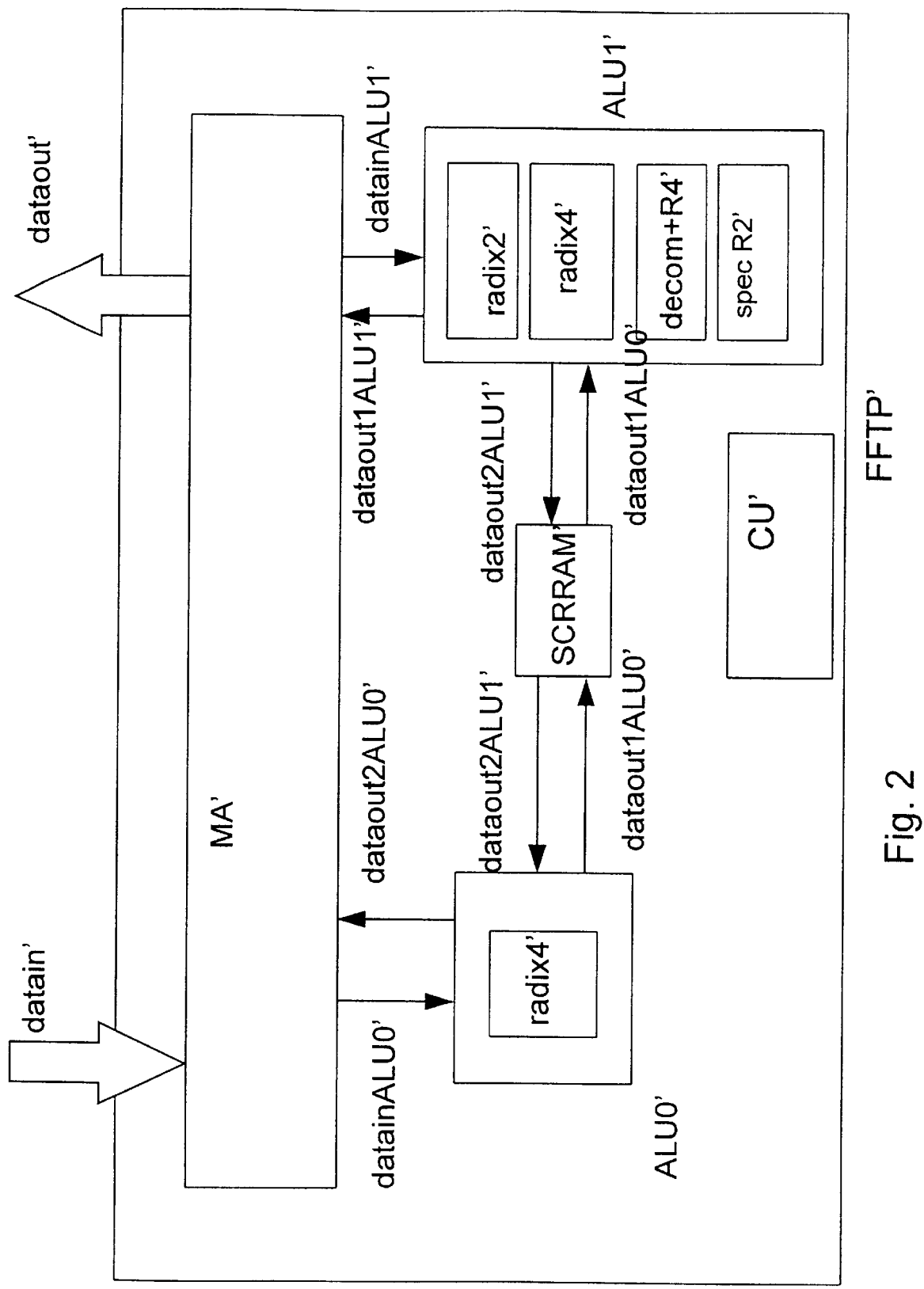
FIG. 2 represents a schematic of a straightforward alternative of the pipelined Fast Fourier Transform Processor FFTP' according to the invention.

In FIG. 2 a straightforward alternative FFTP' of a Fast Fourier Transform Processor according to the invention is depicted. The same basic blocks as these that were present in the first embodiment are included, namely a memory arrangement MA', a scratch memory SCRRAM', a control unit CU', and two arithmetic and logic units, ALU0' and ALU1'. The only difference with respect to the first embodiment is that the incoming data, denoted with datain', is now first processed in the least powerful arithmetic unit, in FIG. 2 being ALU0'. This processing step may consist of the radix 4-type operation, performed by building block radix4', but may as well consist of a bypass operation as was also the case for the first alternative FFTP. First performing a bypass operation may have certain advantages, with respect to the control of the memory arrangement, for instance if a non-even amount of operations is to be performed on the incoming data. In stead of bypassing the final result through the second arithmetic unit ALU1' or ALU1, it may be more advantageous to first bypass the first arithmetic unit ALU0' or ALU0, and to end at the second arithmetic unit ALU1' or ALUL before delivering the dataout. This is depending on the different steps which need to be processed in a certain sequence. Which of both solutions will be implemented in the controller depends on the amount of basic FFT steps to be executed. This will become clear from the following example:

In an embodiment used for very high speed digital subscriber line transmission and receiving modules, wherein a 512 point real FFT and IFFT are to be performed, both first and second alternatives FFTP and FFTP' of the Fast Fourier Transform Processor are combined. FFTP is used for the Fast Fourier Transform, whereas FFTP' is used for the inverse Fast Fourier Transform. This means that, if FIG. 1 is taken as the reference figure for the dataflow, in the FFT direction, the incoming data enters ALU0, whereas for performing the IFFT, the incoming data enters ALU1. The following butterfly FFT calculations are executed as shown by the following tables, whereby DIT is the abbreviation for decimation-in-time, and DIF stands for Decimation-in-frequency

TABLE 1 overview of the sequence of operations to be performed on
the incoming data, for performing a 512 real FFT, whereby the data are
processed from left to right through this table. Reference is to be made to
FIG. 1

| ALU0 | ALU1 | ALU1 | ALU0 | ALU0 | ALU1 |
|---|---|---|---|---|---|
| DIT radix-2 | DIT radix-4 | DIT radix-4 | DIT radix-4 | add/subtr + DIT radix4 | bypass | for the IFFT following butterfly FFT calculations are executed:

TABLE 2 overview of the sequence of operations to be performed on
incoming data, for performing a 512 real IFFT, whereby the sequence is
from left to right through this table and reference is made to FIG. 1.

| ALU1 | ALU0 | ALU0 | ALU1 | ALU1 | ALU0 |
|---|---|---|---|---|---|
| bypass | DIF radix2 + add/sub | DIT radix-4 | DIT radix-4 | DIT radix4 | DIT radix4 |

In the FFT transform direction the data thus enters ALU0, and the final FFT result is delivered via ALU1, to the memory arrangement, whereas the opposite direction is used for IFFT. Nevertheless a lot of other combinations are possible, whereby the control unit is to be adapted each time for realising the particular sequences.

A further remark which needs to be made is that for performing the radix-2 type and radix-4 type of operations, the decimation-in-time steps may be replaced by the decimation-in-frequency steps and vice-versa.

Also for performing complex FFT's and IFFT's both DIT as well as DIF building blocks may be used in the sequence mentioned in a previous paragraph, whereby even the DIT and DIF blocks may be mixed. The latter solution is however not practical and will therefore hardly be used.

As already mentioned, a person skilled in FFT transform algorithms is further adapted to realise different embodiments for performing these radix-2, radix-4 and special radix-2 and radix-4 building blocks, both for the DIT as well as for the DIF variants. Remark that for the DIT, first a multiplication step is executed, followed by add/subtraction steps, whereas this sequence is reversed for the DIF variant. Since such realisations lie outside the scope of this document and can for instance be found in specialised literature, these will not be further discussed in this document.

While the principles of the invention have been described above in connection with specific apparatus, it is to be clearly understood that this description is made only by way of example and not as a limitation on the scope of the invention, as defined in the appended claims.

What is claimed is:

1. Pipelined Fast Fourier Transform processor (FFTP) including
    a memory arrangement (MA) adapted to receive and store successive samples of input data (datain),
    a first arithmetic unit (ALU0) coupled to said memory arrangement (MA) and adapted to receive therefrom a first set of first arithmetic unit input data (datainALU0), to perform thereon at least one type of butterfly Fast Fourier Transform arithmetic calculations, and to generate a first set of first arithmetic unit output data (dataout1ALU0) for delivery to,
    a scratch memory (SCRRAM) coupled to said first arithmetic unit (ALU0) and adapted to temporarily store said first set of first arithmetic unit output data (dataout1ALU0),
    a second arithmetic unit (ALU1) coupled to said scratch memory (SCRRAM) and to said memory arrangement (MA) and adapted to receive from said scratch memory (SCRRAM) said first set of first arithmetic unit output data (dataout1ALU0), to perform thereon either a bypass operation or either said at least one type of butterfly Fast Fourier Transform arithmetic calculations, thereby generating a first set of second arithmetic unit output data (dataout1ALU1) for delivery to said memory arrangement (MA),
    said memory arrangement (MA) thereby being adapted to determine whether said first set of second arithmetic unit output data (dataout1ALU1) constitutes intermediate, resp. final Fast Fourier Transform results,
    whereby, if said first set of second arithmetic unit output data (dataout1ALU1) constitutes final Fast Fourier Transform results, said memory arrangement (MA) is further adapted to deliver said first set of second arithmetic unit output data (dataout1ALU1) as successive Fast Fourier Transform results (dataout) of said successive samples of input data (datain) to an output terminal of said pipelined Fast Fourier Transform processor,
    characterised in that
    said first arithmetic unit (ALU0) is further adapted to perform at least one second type of butterfly Fast Fourier Transform arithmetic calculations on said first set of first arithmetic unit input data (datainALU0), which said second arithmetic unit (ALU1) is not capable of executing,
    said first set of first arithmetic unit output data (dataout1ALU0) thereby being obtained by performing one of either said at least one type or said at least one second type of butterfly Fast Fourier Transform arithmetic calculations on said first set of first arithmetic unit input data (datainALU0).

2. Pipelined Fast Fourier Transform processor (FFTP) according to claim 1
    characterised in that
    said first arithmetic unit (ALU0) is further adapted to perform a bypass operation on said first set of first arithmetic unit input data (datainALU0), said first set of first arithmetic unit output data (dataout1ALU0) thereby consisting of said first set of first arithmetic unit input data (datainALU0).

3. Pipelined Fast Fourier Transform Processor (FFTP;FFTP') according to claim 1
    characterised in that
    said memory arrangement (MA;MA') is further adapted to deliver said first set of second arithmetic unit output data (dataout1ALU1;dataout1ALU1') as said first set of first arithmetic unit input data (datainALU0;datainALU0') to said first arithmetic unit (ALU0;ALU0') if said first set of second arithmetic unit output data (dataout1ALU1;dataout1ALU1') constitutes intermediate Fast Fourier Transform results.

4. Pipelined Fast Fourier Transform Processor (FFTP) according to claim 1
    characterised in that
    said memory arrangement (MA) is further adapted to deliver said first set of second arithmetic unit output data (dataout1ALU1) as a first set of second arithmetic unit input data (datainALU1) to said second arithmetic unit (ALU1), if said first set of second arithmetic unit output data (dataout1ALU1) constitutes intermediate Fast Fourier Transform results, said second arithmetic unit (ALU) is further adapted to receive from said memory arrangement said set of second arithmetic unit input data (datainALU1) and perform thereon either said bypass operation or either said at least one type of Fast Fourier Transform related arithmetic calculations, thereby generating a second set of second arithmetic unit output data (dataout2ALU1) for delivery to said scratch memory (SCRRAM), said first arithmetic unit (ALU0) is further adapted to receive from said scratch memory (SCRRAM) said second set of second arithmetic unit output data (dataout2ALU1), to deliver a second set of first arithmetic unit output data (dataout2ALU0) to said memory arrangement (MA), by performing either a bypass operation or either said at least one type of butterfly Fast Fourier Transform related arithmetic calculations or either said at least one second type of butterfly Fast Fourier Transform related arithmetic calculations on said second set of second arithmetic unit output data (dataout2ALU1), said memory arrangement (MA) thereby being adapted to determine whether said second set of first arithmetic unit output data (dataout2ALU0) constitutes intermediate, resp. final Fast Fourier Transform results, whereby in case said second set of first arithmetic unit output data (dataout2ALU0) constitutes final Fast Fourier Transform results, said memory arrangement (MA) is further adapted to deliver said second set of first arithmetic unit output data (dataout2ALU0) as successive Fast Fourier Transform results (dataout) of said successive samples of input data (datain) to said output terminal of said pipelined Fast Fourier Transform processor, whereby in case said second set of first arithmetic unit output data (dataout2ALU0) constitutes intermediate Fast Fourier Transform results, said memory arrangement (MA) is further adapted to deliver said second set of first arithmetic unit output data (dataout2ALU0) to either said first arithmetic unit (ALU0) as said first arithmetic unit input data (datainALU0) or to either said second arithmetic unit (ALU1) as said second arithmetic unit input data (datainALU1).

5. Pipelined Fast Fourier Transform processor according to claim 1
characterized in that
said at least one type of butterfly Fast Fourier Transform arithmetic calculations consists of a series of calculations for performing a radix-4 type Fast Fourier Transform step.

6. Pipelined Fast Fourier Transform processor (FFTP') including
a memory arrangement (MA') adapted to receive and store successive samples of input data (datain'),
a first arithmetic unit (ALU0') coupled to said memory arrangement (MA') and adapted to receive therefrom a first set of first arithmetic unit input data (datainALU0'), to perform thereon at least one type of butterfly Fast Fourier Transform arithmetic calculations, and to generate a first set of first arithmetic unit output data (dataout1ALU0') for delivery to, a scratch memory (SCRRAM') coupled to said first arithmetic unit (ALU0') and adapted to temporarily store said first set of first arithmetic unit output data (dataout1ALU0'), a second arithmetic unit (ALU1') coupled to said scratch memory (SCRRAM') and to said memory arrangement (MA') and adapted to receive from said scratch memory (SCRRAM') said first set of first arithmetic unit output data (dataout1ALU0'), to perform thereon either a bypass operation or either said at least one type of butterfly Fast Fourier Transform arithmetic calculations, thereby generating a first set of second arithmetic unit output data (dataout1ALU1') for delivery to said memory arrangement (MA'), said memory arrangement (MA') thereby being adapted to determine whether said first set of second arithmetic unit output data (dataout1ALU1') constitutes intermediate, resp. final Fast Fourier Transform results, whereby if said first set of second arithmetic unit output data (dataout1ALU1') constitutes final Fast Fourier Transform results, said memory arrangement (MA') is further adapted to deliver said first set of second arithmetic unit output data (dataout1ALU1') as successive Fast Fourier Transform results (dataout') of said successive samples of input data (datain'), to an output terminal of said pipelined Fast Fourier Transform processor, characterised in that
said second arithmetic unit (ALU1') is further adapted to perform at least one second type of butterfly Fast Fourier Transform arithmetic calculations on said first set of first arithmetic unit output data (dataout1ALU0') which said first arithmetic unit (ALU0') is not capable of executing, whereby said first set of second arithmetic unit output data (dataout1ALU1') is obtained by performing one of either said at least one type or said at least one second type of butterfly Fast Fourier Transform arithmetic calculations on said first set of first arithmetic unit output data (dataout1ALU0') or said bypass operation.

7. Pipelined Fast Fourier Transform processor (FFTP') according to claim 6
characterised in that
said first arithmetic unit (ALU0') is further adapted to perform a bypass operation on said first set of first arithmetic unit input data (datainALU0'), said first set of first arithmetic unit output data (dataout1ALU0') thereby consisting of said first set of first arithmetic unit input data (datainALU0').

8. Pipelined Fast Fourier Transform Processor (FFTP') according to claim 6
characterised in that
said memory arrangement (MA') is further adapted to deliver said first set of second arithmetic unit output data (dataout1ALU1') as a first set of second arithmetic unit input data (datainALU1') to said second arithmetic unit (ALU1'), if said first set of second arithmetic unit output data (dataout1ALU1') constitutes intermediate Fast Fourier Transform results, said second arithmetic unit (ALU1') is further adapted to receive from said memory arrangement said set of second arithmetic unit input data (datainALU1') and perform thereon either said bypass operation or either said at least one type or either said at least one second type of Fast Fourier Transform related arithmetic calculations, thereby generating a second set of second arithmetic unit output data (dataout2ALU1') for delivery to said scratch memory (SCRRAM'), said first arithmetic unit (ALU0') is further adapted to receive from said scratch memory (SCRRAM') said second set of second arithmetic unit output data (dataout2ALU1'), to deliver a second set of first arithmetic unit output data (dataout2ALU0') to said memory arrangement (MA'), by performing either a bypass operation or either said at least one type of butterfly Fast Fourier Transform related arithmetic calculations on said second set of second arithmetic unit output data (dataout2ALU1'), said memory arrangement (MA') thereby being adapted to determine whether said second set of first arithmetic unit output data (dataout2ALU0') constitutes intermediate, resp. Final Fast Fourier Transform results, whereby in case said second set of first arithmetic unit output data (dataout2ALU0') constitutes final Fast Fourier Transform results, said memory arrangement (MA') is further adapted to deliver said second set of first arithmetic unit output data (dataout2ALU0') as successive Fast Fourier Transform results (dataout') of said successive samples of input data (datain') to said output terminal of said pipelined Fast Fourier Transform processor, whereby in case said second set of first arithmetic unit output data (dataout2ALU0') constitutes intermediate Fast Fourier Transform results, said memory arrangement (MA') is further adapted to deliver said second set of first arithmetic unit output data (dataout2ALU0') to either said first arithmetic unit (ALU0') as said first arithmetic unit input data (datainALU0') or to either said second arithmetic unit (ALU1') as said second arithmetic unit input data (datainALU1').

9. Pipelined Fast Fourier Transform processor according to claim 8 characterised in that
said at least one second type of butterfly Fast Fourier Transform related arithmetic calculations consists of a series of calculations for performing a radix-2 type Fast Fourier Transform step.

10. Pipelined Fast Fourier Transform processor according to claim 8 characterised in that
said at least one second type of butterfly Fast Fourier Transform arithmetic calculations consists of an additional add/subtract step followed by a series of calculations for performing a radix-4 type Fast Fourier Transform step.

11. Pipelined Fast Fourier Transform processor according to claim 8 characterised in that
said at least one second type of butterfly Fast Fourier Transform related arithmetic calculations consists of a series of calculations for performing a radix-2 type Fast Fourier Transform step, followed by a additional add/subtract step.

\* \* \* \* \*